Sept. 6, 1932. A. J. MUSSELMAN 1,876,068
BALLOON TIRE AND WHEEL
Filed May 23, 1928 2 Sheets-Sheet 1
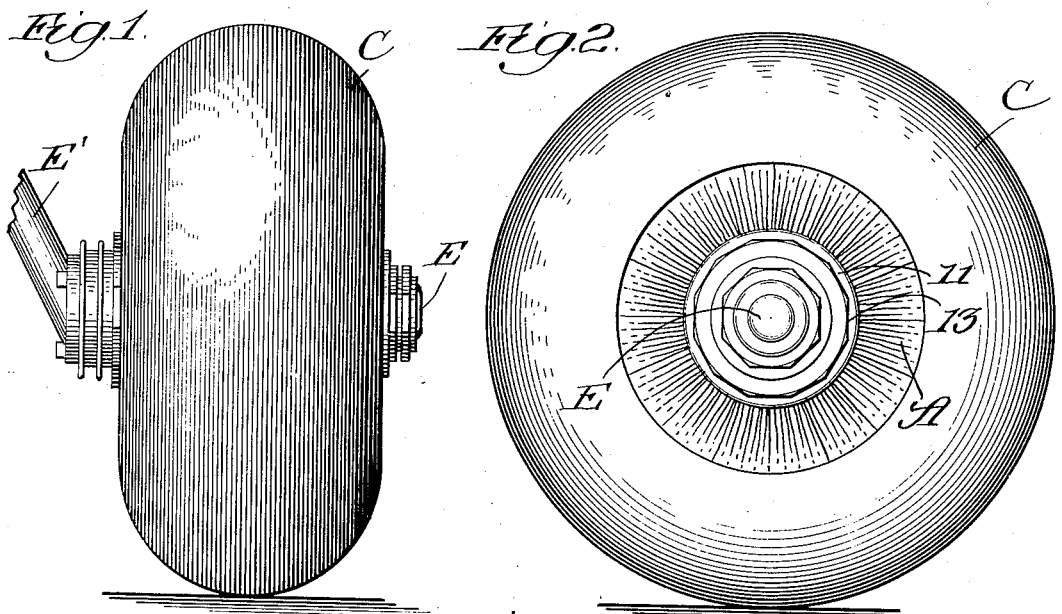
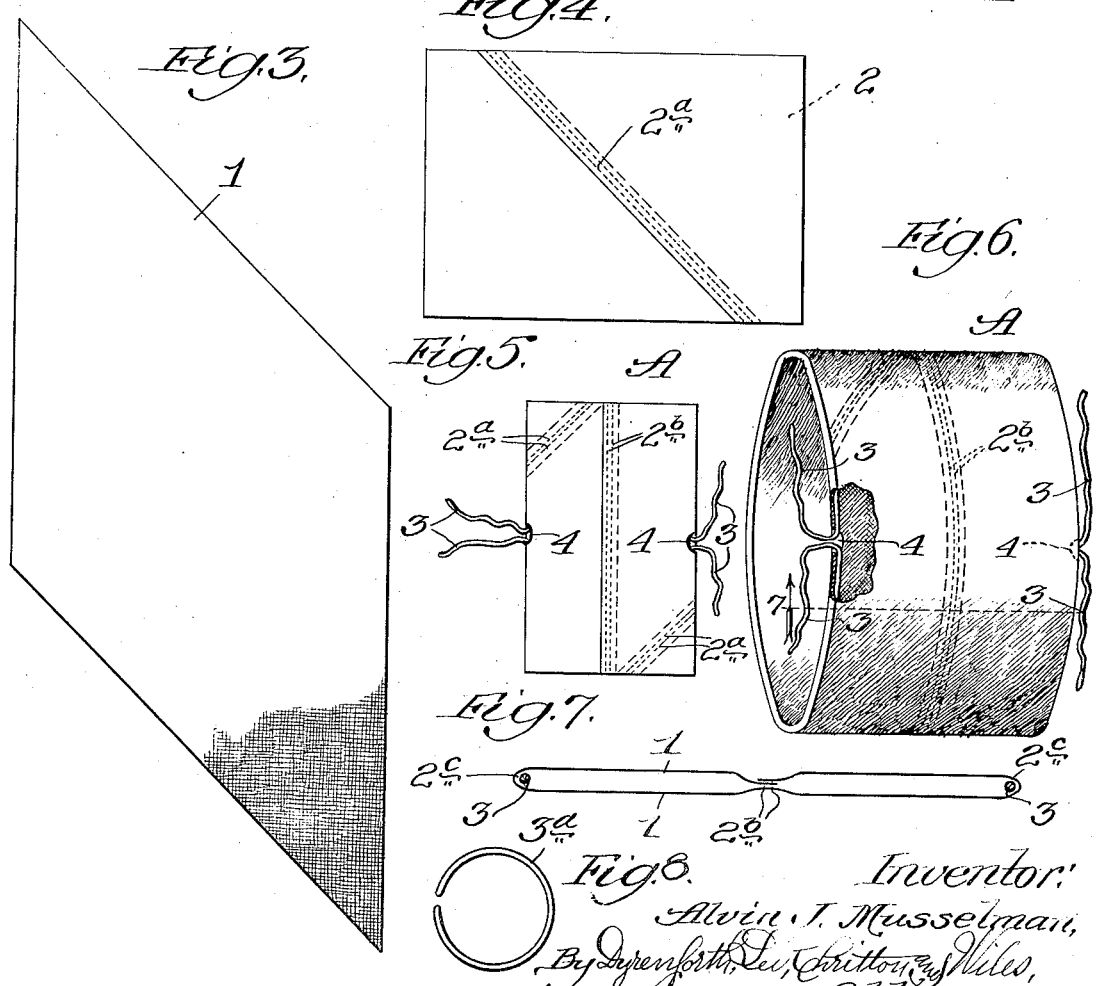

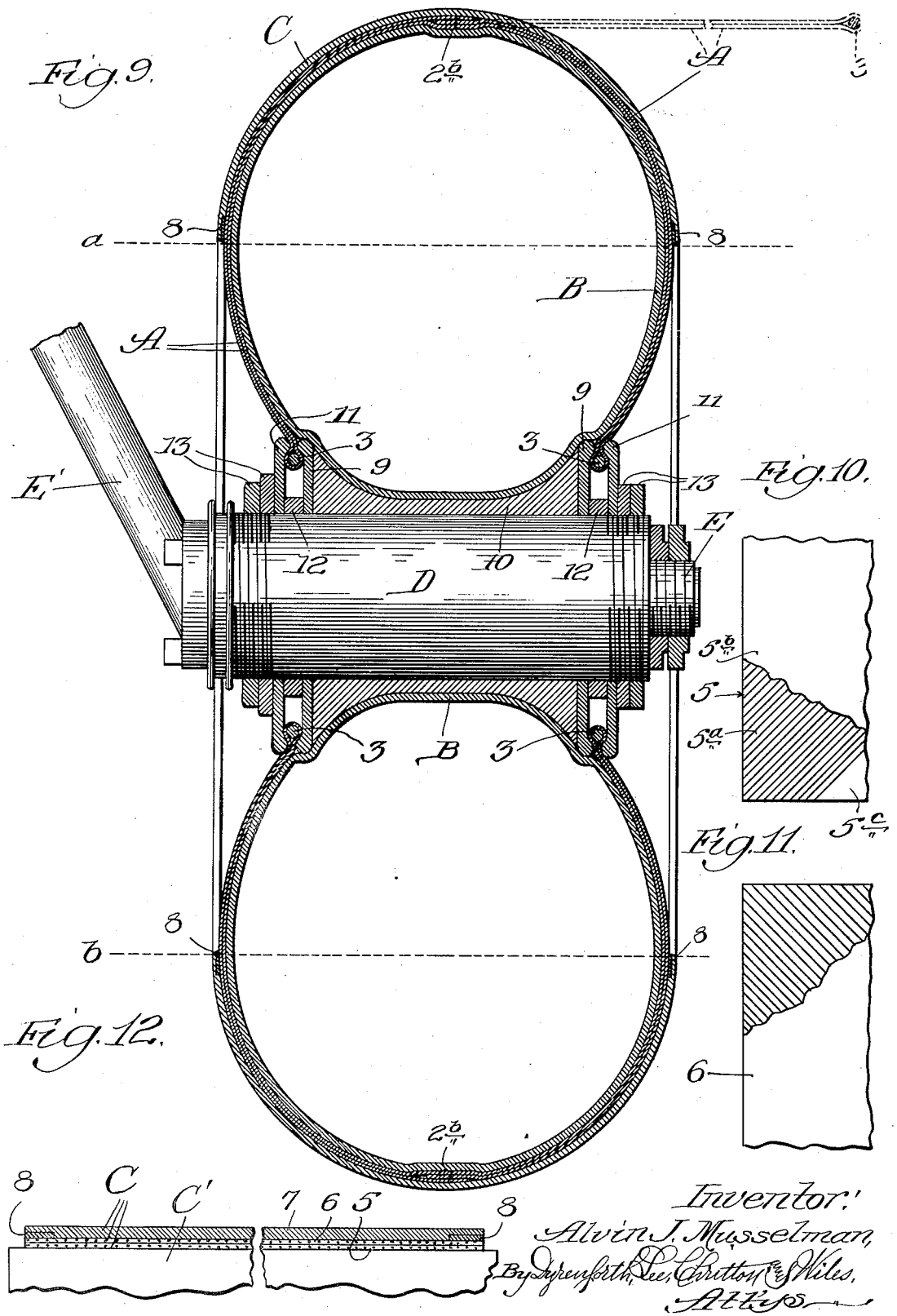

Patented Sept. 6, 1932

1,876,068

UNITED STATES PATENT OFFICE

ALVIN J. MUSSELMAN, OF GLEN ELLYN, ILLINOIS, ASSIGNOR TO THE GOODYEAR TIRE & RUBBER COMPANY, OF AKRON, OHIO, A CORPORATION OF OHIO

BALLOON TIRE AND WHEEL

Application filed May 23, 1928. Serial No. 279,985.

This invention relates particularly to a balloon-tire and wheel and a method of manufacturing the same. Such a wheel is especially adapted to be used on aeroplanes. The invention may be used for other purposes, however. This application is a continuation in part of my copending application, Serial No. 203,107, filed July 2, 1927.

The primary object is to provide an improved tire having very large air capacity for a given tire-diameter. A further object is the provision of an improved wheel.

The invention is illustrated in a preferred embodiment in the accompanying drawings, in which—

Fig. 1 is an elevational view of an aeroplane wheel embodying the invention, viewing the tread of the wheel; Fig. 2, a side elevational view of the wheel; Fig. 3, a view of the fabric employed in making the casing; Fig. 4, a view of a fabric-cylinder formed from the fabric shown in Fig. 3; Fig. 5, a view of the improved casing formed by folding the end-portions of the cylinder shown in Fig. 4 over upon the central portion of the cylinder and sewing the overlapping ends to the central portion of the fabric by a cylindrical series of stitches, the casing being shown inside out; Fig. 6, a perspective view of the casing on a larger scale after the casing has been turned right side out; Fig. 7, an enlarged sectional view taken as indicated at line 7 of Fig. 6; Fig. 8, an elevational view of a ring which may be employed in lieu of the cords, shown in Figs. 5 and 6, for the purpose of shirring the side-flaps of the casing; Fig. 9, a sectional view of the wheel, the hub-barrel being shown in elevation; Figs. 10 and 11, fragmentary views of rubberized fabrics employed in making a casing-cover, or tread; and Fig. 12, a view illustrating one manner in which the casing-cover, or tread, may be formed.

In the illustration given, A designates a tire-casing; B, an inner tube; C, a casing-cover, or tread; D, a hub-barrel on which the tire is mounted directly; and E, a shaft, or axle, on which the hub-barrel is journalled, the axle being secured to a frame-member E' which may constitute a part of the frame, or chassis, of an aeroplane, for example.

A suitable braking device (not shown) may be interposed between the hub-barrel and the axle.

The tire-casing A may be made from any suitably strong pliable material, such as cotton, or silk, preferably impregnated with water-proofing material, such as rubber.

The casing preferably is formed by taking a strip of fabric 1 which is cut on the bias, as illustrated in Fig. 3; forming said strip into a fabric-cylinder 2, as indicated in Fig. 4, the fabric being so folded and sewed as to produce a diagonal seam $2^a$; then telescoping the end-portions of the cylinder 2 over the central portion of the cylinder and causing the edges to overlap where they are sewed together and to the central portion of the cylinder, as by means of annular series of stitches $2^b$, thus forming the casing (inside out), as shown in Fig. 5; then finally turning the casing right side out, so that it will appear as shown in Fig. 6.

This mode of procedure results in forming a double-ply casing having loops at its lateral edges, as indicated at $2^c$.

In the illustration given in Figs. 5 and 6, shirring-cords 3 are introduced within the loops. The cords thus form rings, and have the end-portions projecting through perforations 4 which are cut in the walls of the loops.

By means of the cords, the lateral edge-portions of the casing A may be collapsed, or shirred, so that the loops are reduced to relatively small circular configuration, adapted to be engaged by suitable tire-retaining means, such as shown in Fig. 9. It will be understood that the original diameter of the casing A corresponds approximately with the greater diameter of the tire. This is indicated by the dotted lines in Fig. 9.

Instead of employing cords for shirring the edge-portions of the casing, a soft-metal split-ring $3^a$ (Fig. 8) can be employed. For example, a split-ring may be employed to gather the material of the loop upon the ring, thus reducing the loop to the proper size to be engaged by the retaining flanges of the hub.

The casing-cover, or tread, C may be formed separately, as in the illustration given. Obviously, however, a tread may be vulcanized upon the tread-portion of the casing, if desired.

In the illustration given, the tread C is formed on a mandrel C' of substantially the diameter indicated between the dotted lines $a$ and $b$ in Fig. 9. The tread is shown as comprising fabrics 5 and 6 and a facing of rubber 7 which may be of any desired thickness, and which may be suitably reinforced, if desired.

The fabric 5, for example, is shown composed of parallel diagonal cords $5^a$ secured between light rubber sheets $5^b$ and $5^c$. The fabric 6 is similarly formed. The fabrics are placed upon each other so that the cords will cross each other. Upon the lateral margins of the strips of fabric are placed inextensible tapes 8; and the rubber sheet 7 is placed over the inner plies and the inextensible tapes 8. The cylindrical tread is then vulcanized, the member C' serving as a mandrel.

The hub-barrel D is shown equipped with a pair of inner retainer-rings 9; a spacing-sleeve 10; and an outer pair of retainer-rings 11. The sleeve 10 may be of wood, if desired. It is made concave at its outer surface to afford a seat for the inner tube B.

It will be observed that shock absorbing devices such as those ordinarily employed in aeroplane landing equipment and disposed upon the frame E' or between the frame E' and the pneumatic wheel assembly A D are omitted and are entirely unnecessary when the aeroplane is equipped with pneumatic wheels constructed according to this invention.

In the assembling operation, the tube B and the casing A are placed in position with reference to the hub-barrel, the shirred loops of the casing being engaged by beads with which the rings 9 and 11 are equipped. The inner tube is then inflated. If desired, partial inflation may be made before the casing and tube are applied to the hub-barrel.

In the inflating operation, the fabric of the casing can adjust itself over the shirring rings, so that the stresses will be properly distributed. When inflation occurs, the casing assumes a circular cross-section, except at the portion where the casing is secured to the hub. Under inflation, the casing (disregarding the tread) assumes a true circular cross-section throughout all except the portion which is mounted on the hub, and presents a smooth outer surface at all points outside a transversely diametral line through the section. The inner portions of the side walls of the casing are necessarily gathered, or puckered, somewhat as indicated by the radial lines on Fig. 2. Thus, the cloth is bunched, or shirred, throughout the zones which are embraced by the retaining-flanges.

In practice, any desired number of plies may be employed. It is preferable to employ a plurality of very thin flexible plies of limp fabric, rather than a heavier single ply.

The retainer-flanges 9 and 11 are shown separated by spacing-rings 12; and the retainer-flanges, which are slidable on the hub-barrel, are shown clamped together and against the sleeve 10 by means of nuts 13 which are threaded upon the hub-barrel. It is preferred so to construct the retainer-rings that the plies can slip over the shirring-rings 3 as the casing adjusts itself during the period of inflation. The loop-portions of the fabric and the shirring-rings must, however, be large enough to prevent them from slipping out of engagement with the retainer-rings.

Instead of forming the tread C in the manner described, it may be originally vulcanized in the form illustrated in cross-section in Fig. 9. When formed in the manner described, the inflation of the tire will cause the tread to assume the form shown in Fig. 9, the strong inextensible tapes 8 being disposed at the sides of the casing.

In the illustration given, the wheel comprises a hub-barrel equipped with tire-retaining flanges, and a balloon tire mounted directly on the hub-barrel. Thus a wheel-rim separated from the hub by a space, and spokes, or disks, intervening between such rim and the hub are not required. The wheel-diameter is thus mainly made up by the casing itself. In the illustration given, the wheel-diameter (tire-diameter) is about six times the hub-diameter. This feature of substituting tire-fabric for spokes or disks and outer rim enables a very large casing-diameter (section at one side of hub) relative to the tire-diameter (wheel as a whole) to be employed.

The improved tire can be manufactured cheaply, and is adapted to provide a maximum air capacity and a large tread. Thus, the wheel is adapted to support a heavy body, while employing very low air pressure. Thus, if an aeroplane is forced to alight on marshy ground, it is possible for the wheels to continue to roll, instead of sinking into the ground. Furthermore, the improved wheel is well adapted to prevent injury to an aeroplane in alighting, since the wheel is substantially all of pneumatic character.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. A low pressure pneumatic wheel structure comprising a rubberized fabric band, normally of cylindrical shape, means in the band for contracting edge portions thereof so that the normally cylindrical band assumes a toroidal shape and means independent of the contracting means for securing the contracted edge portions upon a rotatable hub.

2. A low pressure pneumatic wheel comprising a flexible casing gathered at its inner circumferential portions to form plaits at the sides of the wheel, and bead elements having said inner portions of the casing gathered thereon.

3. A low pressure pneumatic wheel comprising a flexible casing having loops at its edge portions, and gathering means extending freely through said loops, the looped edge portions of the casing being gathered upon the gathering means to form plaited regions at the looped edge portions of the wheel.

4. In a pneumatic wheel having a hub mounted directly upon a supporting axle, a low pressure casing mounted directly upon the hub, the side walls of the casing being shirred radially toward the edges of the casing to form plaits, and bead elements securing the edge portions of the casing in shirred relation upon the hub.

ALVIN J. MUSSELMAN.